US006949005B1

(12) United States Patent
Larsen et al.

(10) Patent No.: US 6,949,005 B1
(45) Date of Patent: Sep. 27, 2005

(54) GRINDING ASSEMBLY, GRINDING APPARATUS, WELD JOINT DEFECT REPAIR SYSTEM, AND METHODS

(75) Inventors: Eric D. Larsen, Idaho Falls, ID (US); Arthur D. Watkins, Idaho Falls, ID (US); Rodney J. Bitsoi, Ririe, ID (US); David P. Pace, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 18 days.

(21) Appl. No.: 10/896,411

(22) Filed: Jul. 21, 2004

(51) Int. Cl.[7] .............................................. B24B 49/00
(52) U.S. Cl. .............................. 451/5; 451/66; 451/259
(58) Field of Search ............................... 51/5, 6, 65, 66, 51/67, 111, 158, 259, 278

(56) References Cited

U.S. PATENT DOCUMENTS

| | | | |
|---|---|---|---|
| 4,777,769 A | 10/1988 | McLaughlin et al. | .... 51/165.71 |
| 4,864,777 A | 9/1989 | McLaughlin et al. | ......... 51/281 |
| 5,299,389 A | 4/1994 | Yonaha et al. | ................. 51/165 |
| 5,359,815 A | 11/1994 | Schrunk, III et al. | ........ 451/347 |
| 5,917,875 A * | 6/1999 | Tuzio et al. | ................. 376/245 |
| 6,227,953 B1 * | 5/2001 | Matsuo et al. | .............. 451/190 |

* cited by examiner

Primary Examiner—Jacob K. Ackun, Jr.
(74) Attorney, Agent, or Firm—Wells St. John P.S.

(57) ABSTRACT

A grinding assembly for grinding a weld joint of a workpiece includes a grinder apparatus, a grinder apparatus includes a grinding wheel configured to grind the weld joint, a member configured to receive the grinding wheel, the member being configured to be removably attached to the grinder apparatus, and a sensor assembly configured to detect a contact between the grinding wheel and the workpiece. The grinding assembly also includes a processing circuitry in communication with the grinder apparatus and configured to control operations of the grinder apparatus, the processing circuitry configured to receive weld defect information of the weld joint from an inspection assembly to create a contour grinding profile to grind the weld joint in a predetermined shape based on the received weld defect information, and a manipulator having an end configured to carry the grinder apparatus, the manipulator further configured to operate in multiple dimensions.

41 Claims, 6 Drawing Sheets

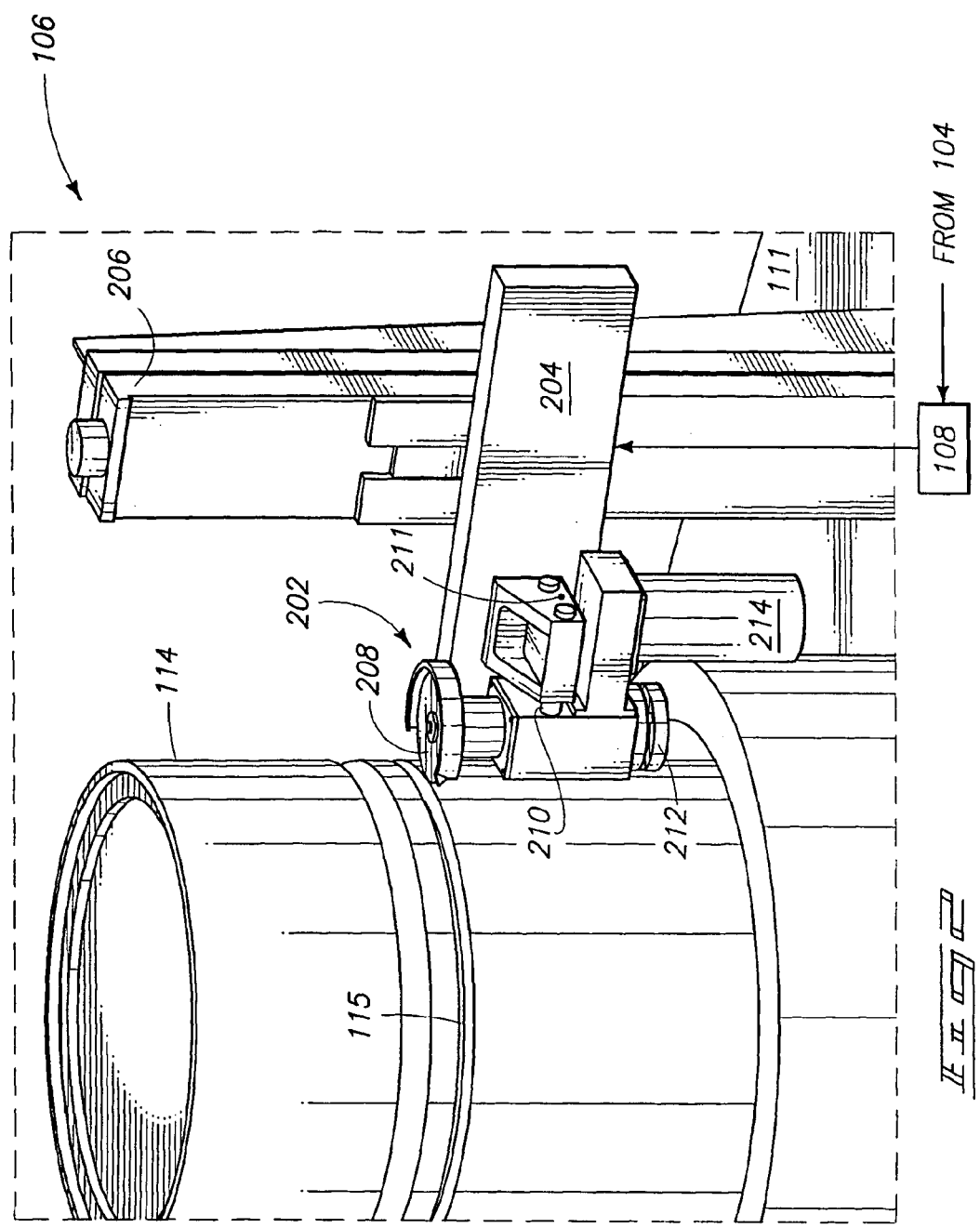

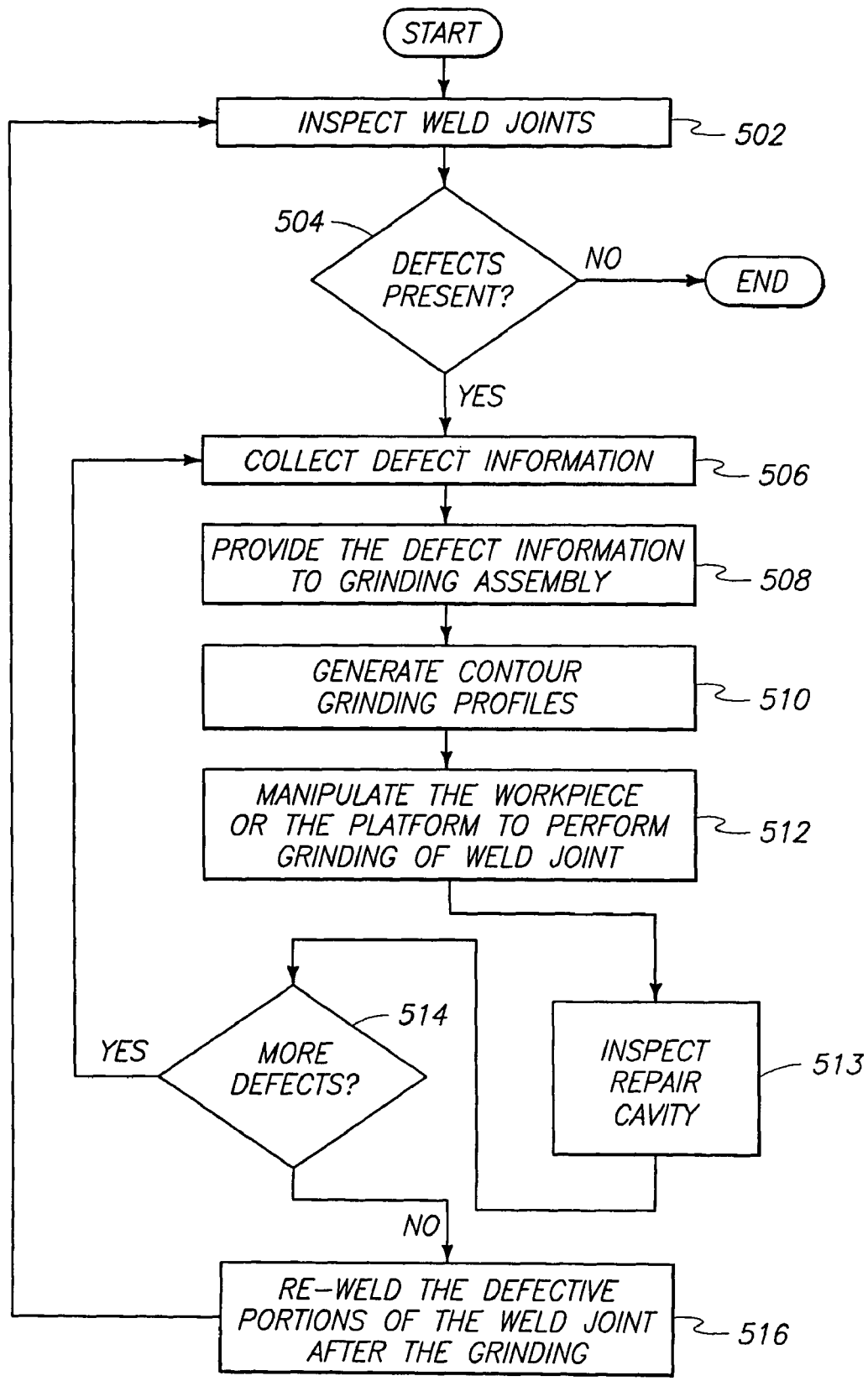

GRINDING ASSEMBLY, GRINDING APPARATUS, WELD JOINT DEFECT REPAIR SYSTEM, AND METHODS

GOVERNMENT RIGHTS

This invention was made with Government support under Contract DE-AC07-991D13727 awarded by the U.S. Department of Energy. The Government has certain rights in the invention.

TECHNICAL FIELD

The invention relates to grinding apparatus and methods. Some aspects of the invention relate more particularly to automated grinding apparatus for use in hazardous environments.

BACKGROUND OF THE INVENTION

Hazardous materials are typically sealed in canisters for long term storage and to prevent such materials from escaping into the environment. The sealing of canisters for long term storage of high level nuclear waste requires equipment that can be remotely operated with little or no intervention by personnel. Such canisters carrying nuclear waste or other hazardous materials are typically remotely closed, welded, and then inspected before being approved for long term storage. Welding and inspection of such canisters is performed in a hot cell to limit exposure of personnel to radioactive radiation. A hot cell may be a room with thick walls and windows where one can work with radioactive materials that are detrimental to humans. The thick wall and window structures of the hot cell prevent harmful radiation from escaping out of the room. Prior to storage of the canisters, any weld defects of the canister (e.g., of a weld joint) must be identified and repaired. If a defect is detected in a weld joint, such defect must be repaired and the weld joint must be re-welded before approval. Removal of such weld defects may have to be carried out either by machining or by grinding processes.

Sealing of canisters for long term storage of high level nuclear waste requires equipment that can be operated remotely with little or no intervention by personnel. The canisters are typically remotely closed, welded, and then inspected before being approved for storage. Welding and inspection usually take place within a hot cell to limit exposure of personnel to hazards.

Machining processes present problems because cutting fluid or other lubricants may have to be used with tools for the machining processes. Usage of liquids inside the hot cell is undesirable as such a step introduces waste into the hotcell, and therefore additional steps may have to be undertaken to dispose the newly introduced waste products. Grinding processes eliminate the need for the cutting fluid. However, current grinding systems are inadequate for use in hot cells due to lack of automation. Further, current grinding systems are not accurate enough for use with specific weld joint designs (e.g., narrow groove weld joint designs) as they tend to remove too much of the weld from a weld joint, and thus may contribute to addition of excessive heat into the re-welded joint. Excessive heat was found to have detrimental effects on mechanical properties of the weld joints.

It would be desirable to have, in some embodiments, grinding apparatuses to repair weld defects in remote hot cells. It would also be desirable to avoid the above-identified problems by providing automated grinding apparatuses, in some embodiments.

It would be desirable to repair a weld defect of a weld joint without causing further damage to the joint while retaining as much of the original geometry of the joint as it is possible to simplify the repairing of the weld joint defect in some embodiments.

SUMMARY OF THE INVENTION

Some aspects of the invention provide a grinding apparatus to repair weld defects in remote hot cells—the grinding apparatus being configured to operate in both completed welds and partially completed welds.

Some aspects of the invention provide an apparatus to repair a weld defect of a joint without causing further damage to the joint while retaining as much of the original geometry of the joint as it is possible to simplify the repairing of the defect of the joint.

Some aspects of the invention provide a grinding apparatus configured to automatically grind a pre-selected contoured repair cavity.

In one aspect, a grinding assembly for grinding a weld joint of a workpiece includes a grinder apparatus, a grinder apparatus includes a grinding wheel configured to grind the weld joint, a member configured to receive the grinding wheel, the member being configured to be removably attached to the grinder apparatus, and a sensor assembly configured to detect a contact between the grinding wheel and the workpiece. The grinding assembly also includes a processing circuitry in communication with the grinder apparatus and configured to control operations of the grinder apparatus, the processing circuitry configured to receive weld defect information of the weld joint from an inspection assembly to create a contour grinding profile to grind the weld joint in a predetermined shape based on the received weld defect information, and a manipulator having an end configured to carry the grinder apparatus, the manipulator further configured to operate in multiple dimensions.

In another aspect, a grinder apparatus for grinding a weld joint of a workpiece based on a grinding profile created by a processing circuitry. The grinder apparatus includes a grinding wheel configured to grind the weld joint and configured to be driven by a motor, a removably attachable member configured to detachably receive individual ones of a plurality of tools including the grinding wheel, a sensor assembly in communication with the motor, the sensor assembly configured to detect a contact between the grinding wheel and the workpiece to operate the grinding wheel to grind the weld joint, wherein operations of the grinder apparatus are controlled by the processing circuitry, the grinding profile being created using weld defect information of the weld joint, the weld defect information being received from an inspection assembly.

In yet another aspect, a weld joint defect repair system includes an inspection assembly having a first processor in communication therewith, the inspection assembly is configured to inspect weld joints of a workpiece to identify weld joint defects. The system includes a grinding assembly having a grinding apparatus and second processor in communication therewith, the second processor is configured to receive information related to the weld joint defects from the first processor. The second processor is further configured to create a distinct contour grinding profile based on the received information. The grinding apparatus includes a grinding wheel configured to grind the weld joints to rectify the weld joint defects, a removably attachable member configured to detachably receive individual ones of a plurality of tools including the grinding wheel, and a sensor assembly configured to detect a contact between the grinding wheel and the workpiece to operate the grinding wheel to grind the weld joints based on the contour grinding profile created by the second processor. The system also includes a welding assembly having a third processor in communication therewith and the first and second processors, the third processor configured to receive information related to the weld joint defects from the first processor and a contact location of the grinding wheel with the workpiece from the second processor, the third processor further configured to manipulate at least one of the workpiece or a platform carrying the inspection assembly, the grinding assembly, and the welding assembly in order to accurately position the grinding wheel to grind the weld joints to rectify the weld joint defects.

In a further aspect, a method of correcting weld joint defects of an object includes inspecting a weld joint of the object to determine a defect, collecting information corresponding to the defect, providing the collected information to a grinding assembly having a grinder apparatus and a processing circuitry that is in communication with the grinder apparatus, the grinder apparatus having a grinding wheel, a sensor switch, and a manipulator arm configured to carry the grinding wheel, generating a contour grinding profile based on the collected information to grind the weld joint to rectify the defect, rotating one of the object or a platform carrying the grinding assembly to manipulate the grinding wheel to a position to grind the weld joint, and operating the grinding wheel based on the contour grinding profile to remove the defect of the weld joint.

BRIEF DESCRIPTION OF THE DRAWINGS

Preferred embodiments of the invention are described below with reference to the following accompanying drawings.

FIG. 2 is a partial perspective view of a grinder assembly to perform grinding operations on the canister identified in the canister closure station as in FIG. 1A.

FIG. 5 is a methodology to correct a weld joint defect of a workpiece.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1A:
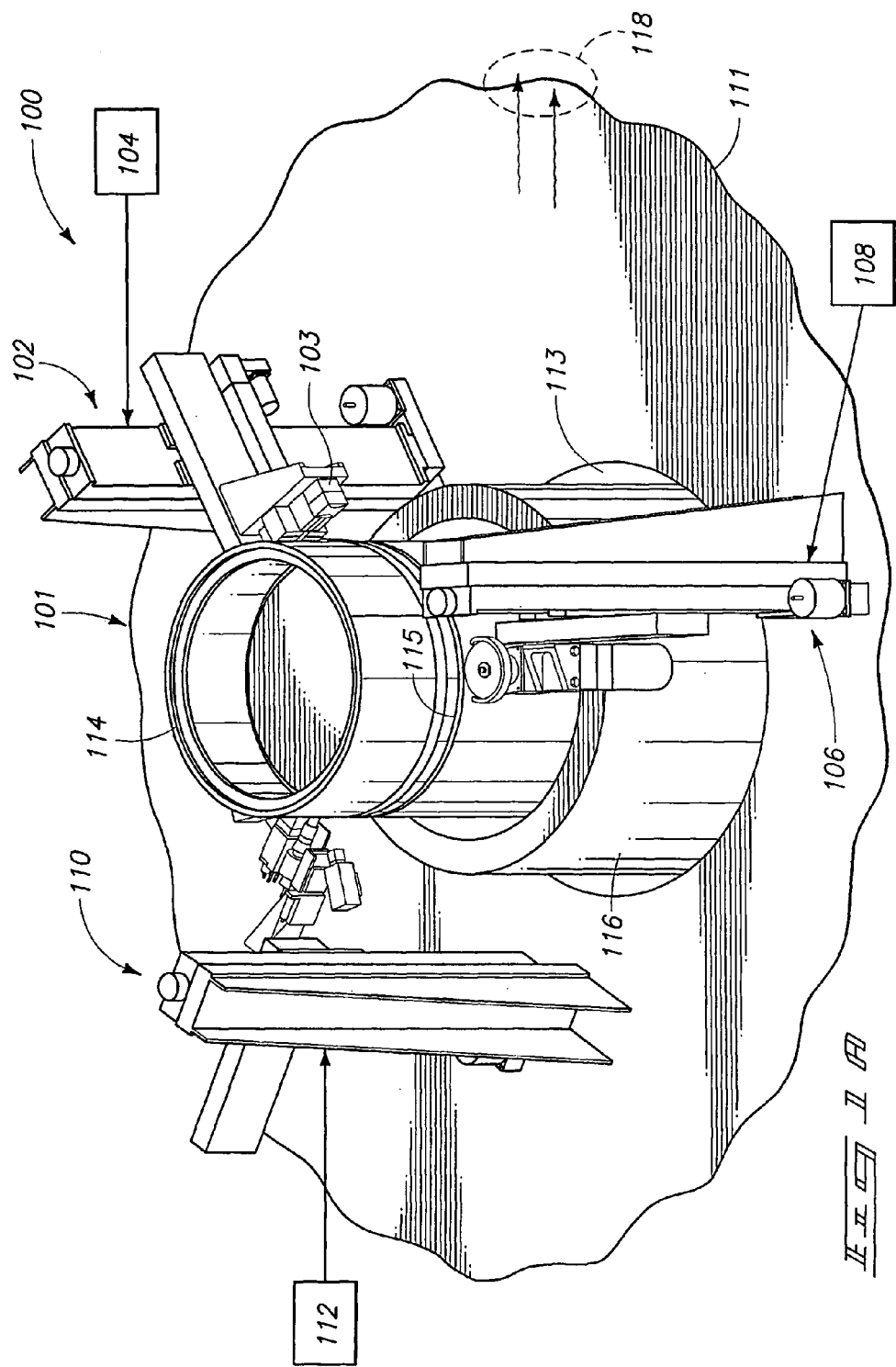
FIG. 1A is an overall schematic of a canister closure station configured to perform inspection, grinding, and welding operations on a canister in accordance with various aspects of the invention.
Figure 4:
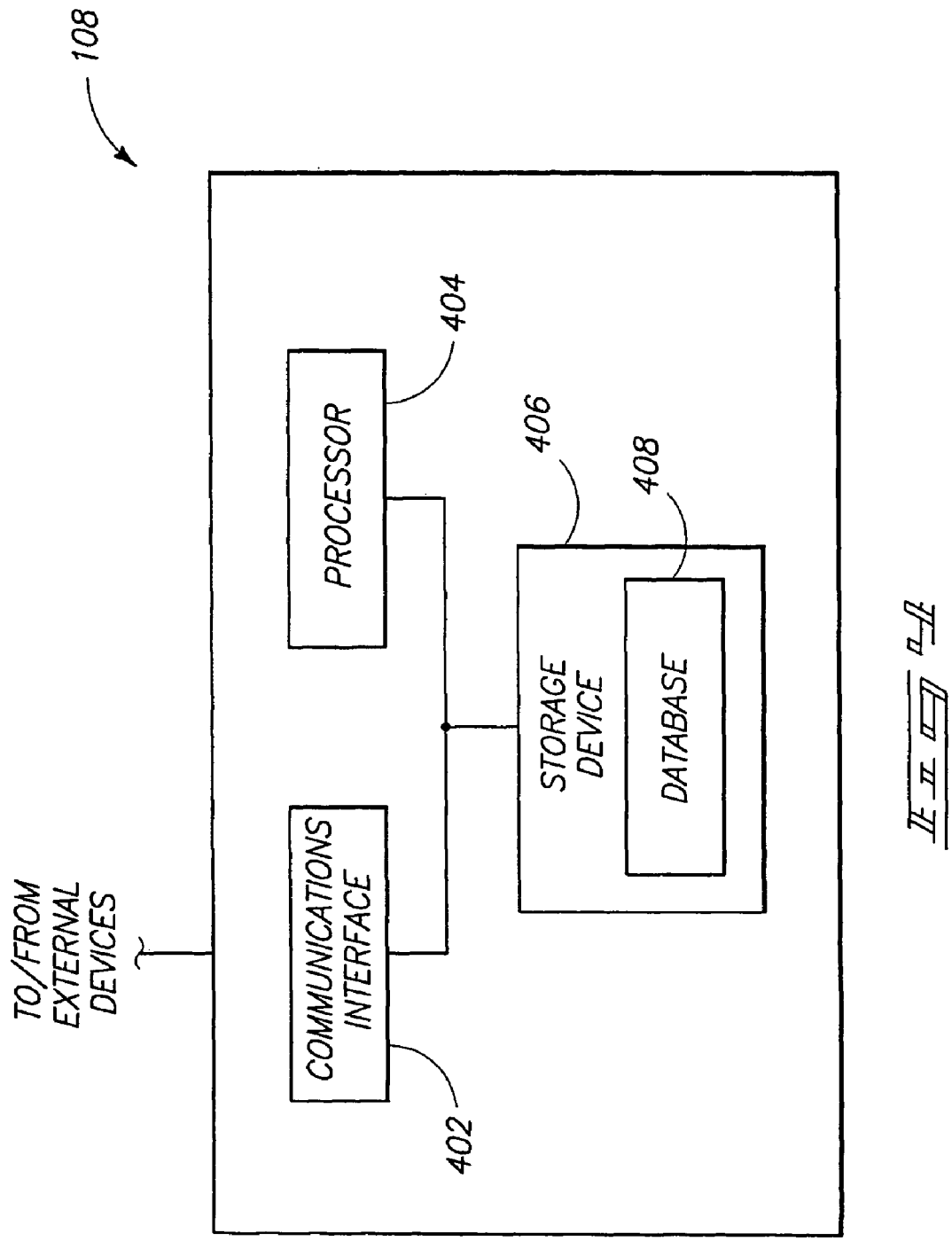
FIG. 4 is a schematic of a processing circuitry that is in communication with the grinder assembly as shown in FIG. 2.

FIG. 1A is a schematic of an overall system 100 configured to inspect (e.g., non-destructive examination) and repair (e.g., grind, weld) a workpiece (e.g., waste canister) in accordance with various aspects of the invention. More particularly, the system 100 includes a room, such as a hot cell, 101, an inspection assembly 102 having inspection apparatus 103 and a processing circuitry 104, a grinding assembly 106 having a processing circuitry 108, and a welding assembly 110 having a processing circuitry 112. The respective processing circuitry 104, 108, and 112 are alternatively referred to herein as control computer. The processing circuitry 104, 108, 112 may be located inside or outside of the room 101. Although shown as distinct components in FIG. 1A, the processing circuitry 104, 108, 112 may be configured as a single control computer that may be disposed inside or outside of the room 101. Further details of the processing circuitry 104, 108, 112 are shown at FIG. 4. In some embodiments, the room 101 is defined as an area confined by the system 100 within which processing (e.g., repairing of a weld joint) of a canister 114 is performed.

The inspection apparatus 103 may comprise devices/tools configured to perform ultrasonic, eddy current, laser, and visual inspection techniques to determine weld defects of a weld joint (e.g., reference numeral 115 as shown in FIG. 2) of the canister 114. One or more of the above-noted measurement techniques may be used to determine the geometry (e.g., length, width, depth or thickness) of the weld defect. The inspection, grinding, and welding assemblies 102, 106, and 110, respectively, are fixedly supported on the platform 111 with a predetermined distance between them. Thus, upon detecting a weld defect in a weld joint 115 of the canister 114 during an inspection process, the position or location of the weld defect with reference to the grinding and welding assemblies may be readily determined, as the distance between the inspection, grinding, and welding assemblies 102, 106, 110 is known apriori. Such defect and location information is collected and stored in the processing circuitry 104. In some embodiments, the weld defect information is provided to the processing circuitry 108 of the grinding assembly 106, and the defect location information is provided to the processing circuitry 112 of the welding assembly 110. The processing circuitry 112 is configured to rotate and position the canister 114 in close proximity to components (e.g., grinding wheel 208 of FIG. 2) of the grinding assembly 106. Further such details are set forth below with reference to FIG. 2.

The inspection assembly 102, the grinding assembly 106, and the welding assembly 110 are provided on a platform 111 having an opening 113 through which the canister 114 may be introduced into the room 101. In some embodiments, a shield (e.g., radioactive shield) 116 is arranged in the opening 113 such that the canister 114 requiring inspection and repair (e.g., grinding and re-welding) is surrounded by the shield 116 and the canister 114 is introduced into the room 101 by upwardly reciprocating the canister 114 to protrude out of the shield 116.

The shield 116 may be made of materials (e.g., lead, bismuth) that are configured to absorb radiation emanating from the canister 114. The shield 116 may also be used to protect equipment or portions of equipment from harmful radiation that may emanate from the canister 114, in some embodiments. For example, in some embodiments, if the processing circuitry 104, 108, 112 are located within the room 101, then the shield 116 may be used to protect such processing circuitry from the harmful radiation by arranging the processing circuitry 104, 108, 112 such that the shield 116 is disposed between the canister 114 and such processing circuitry 104, 108, 112. An exhaust system (not shown) may be removably connected to an opening 118 provided in the room 101 in order to remove debris produced during an operation of the grinding assembly 106.

Figure 1B:
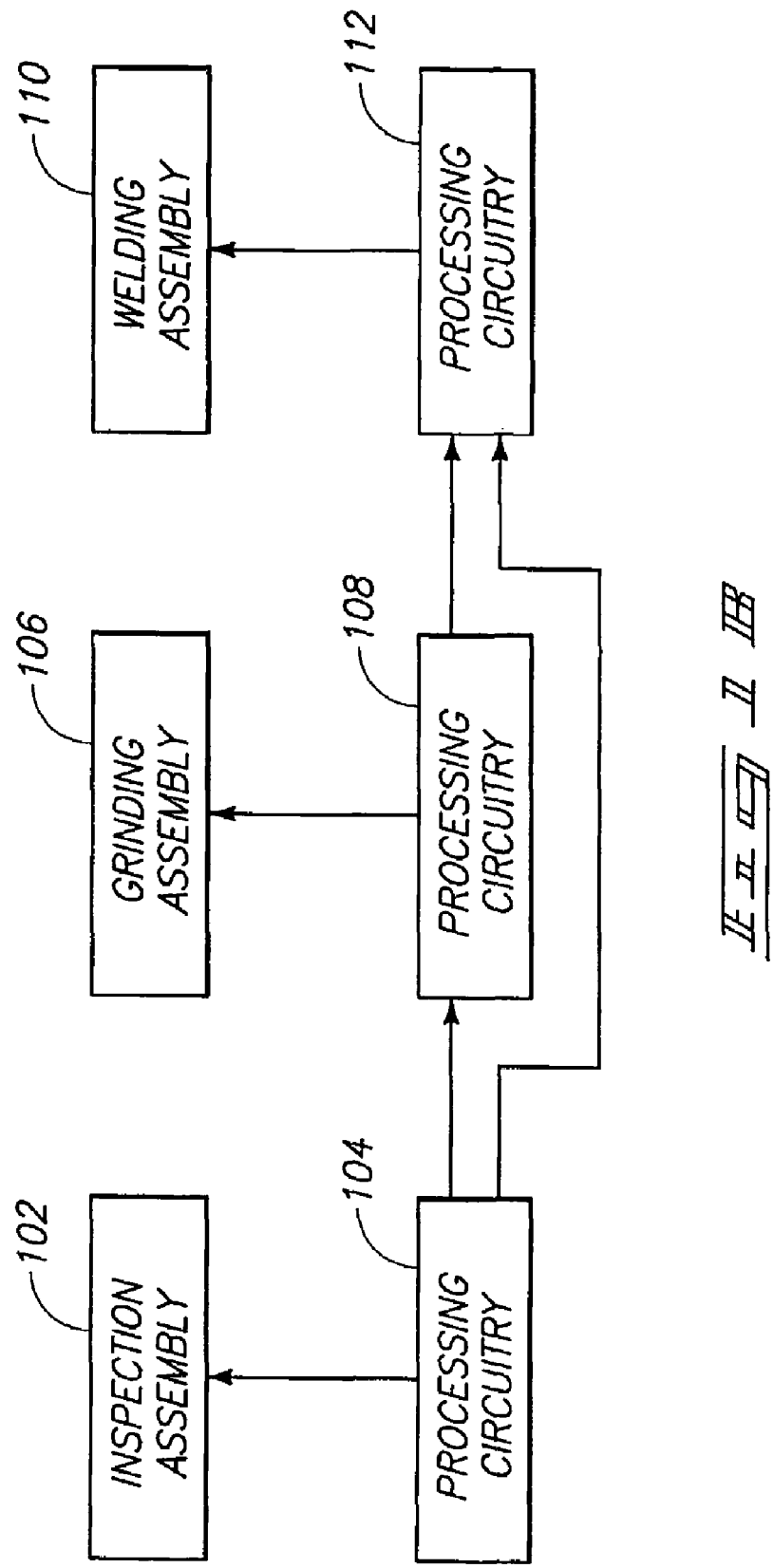
FIG. 1B is a simplified block diagram schematic of an inspection assembly, a grinding assembly, and a welding assembly and respective processing circuitry to control operations thereof in a canister closure station.

FIG. 1B is a simplified block diagram schematic of the inspection assembly 102, the grinding assembly 106, and the welding assembly 110, and respective processing circuitry 104, 108, 112, as shown in FIG. 1A, where elements like those shown in FIG. 1A are illustrated using like reference numerals. The processing circuitry 104, 108, and 112 are respectively configured to control operations of the inspection assembly 102, the grinding assembly 106, and the welding assembly 110. The processing circuitry 108 is configured to receive information from the processing circuitry 104 in order to perform grinding operations using the grinding assembly 106. The processing circuitry 112 is configured to receive information from the processing circuitry 104 as well as the processing circuitry 108 to perform welding operations using the welding assembly 110.

FIG. 2 is a detailed partial perspective view of the grinding assembly 106 arranged to perform grinding operations on the canister 114. The grinding assembly 106 includes a grinder apparatus 202 mounted on linear slides 204 and 206 that are disposed orthogonal to each other to impart motion control of the grinder apparatus 202 along X and Y axes. The Z-axis motion control for the grinder apparatus 202 may be provided either by a turntable configured to rotate the canister 114 and also configured to upwardly and downwardly reciprocate the canister 114 or by rotating the platform 111 (FIG. 1A), or by rotating both the canister as well as the platform, as desired. The linear slides 204 and 206 may together be referred to as a manipulator configured to manipulate the movement of the grinder apparatus 202.

The grinder apparatus 202 includes a grinding wheel 208, a spring loaded slide assembly (e.g., compliance joint) 210, an air cylinder 212, and an electric motor 214.

The grinding wheel 208 is latched into the grinder apparatus 202 with the actuation of the air actuated cylinder 212 and configured to grind weld defects at a weld joint (e.g., weld joint 115) of the canister 114. The slide assembly 210 is provided with limit switches to measure grinding wheel wear, thereby preventing excessive motion of the linear slide 204.

The spring loaded slide assembly 210 comprises a switch or trigger mechanism 211 configured to provide information to the processing circuitry 108 regarding the positioning of the grinding wheel 208 relative to a surface of the canister 114. For example, in some embodiments, the switch 211 may be configured to provide information to the processing circuitry 108 when the grinding wheel 208 is in contact with the surface (e.g., weld joint 115) of the canister 114, and vice-versa.

The air actuated cylinder 212 enables the grinding wheel 208 to be replaced with a replacement grinding wheel. In some embodiments, the air actuated cylinder 212 enables the grinding wheel 208 to be replaced with individual ones of a variety of tools (e.g., grinding tools, wire wheel brush, etc.). Further such details regarding replacing tools of the grinder apparatus 202 are provided with reference to FIG. 3.

In operation, weld joints (e.g., weld joint 115) are inspected by the inspection assembly 102 (FIG. 1A) and information related to the weld defects of the weld joint 115 is collected by the processing circuitry 104 of the inspection assembly 102. Inspection for weld defects is performed along the circumference of the weld joint 115 as well as in the thickness dimension of the weld joint 115. Weld defect information may include, for example, type of defect, defect geometry such as length, width, and depth of the defect, and location of the defect on the canister 114. Such information collected by the processing circuitry 104 is provided to the processing circuitry 108 of the grinding assembly 106. The processing circuitry 108 is in communication with the grinding assembly 106 and is configured to control operations of the grinding assembly 106. The processing circuitry 108 is configured to receive information related to the weld defect from the inspection assembly 102, and using logic (e.g., algorithms or code) stored therein is configured to generate distinct grinding profiles (e.g., contour grinding profiles) based on the weld defect in order to grind the weld defect.

More particularly, the grinding assembly 106 is able to grind a selected shape from a plurality of predefined shapes. The inspection assembly 102 includes at least one of an eddy current probe, ultrasonic probe, or a visual inspection probe capable of inspecting a cavity of a particular shape, and the grinding assembly 106 is able to grind that particular shape. A combination of such inspection probes may also be used as desired. For example, an eddy current inspection probe may be used to identify surface breaking defects of a weld joint, an ultrasonic inspection probe may be used to identify defects present within the volume of the weld joint, and the visual inspection probe (e.g., laser sensor probe) may be used identify surface defects. The processing circuitry 108 of the grinding assembly 106 is provided with ideal geometries of various types of weld joints including, for example, weld joint 115. The processing circuitry 108 compares the information received from the inspection assembly 106 with the geometry information of a corresponding ideal weld joint and creates a grinding profile to remove the defects identified in the weld joint. For example, a created grinding profile may include information to cause a grinding wheel to grind a weld joint to a particular width or a particular depth in order to grind out an identified defect in the weld joint. The grinding profile is created to grind out the defect in the weld joint while retaining as much of the original joint geometry as possible.

Information (e.g., position of the defect, defect geometry) related to the weld defect of the weld joint 115 is provided to the processing circuitry 112 of the welding assembly 110. The processing circuitry 112 is configured to rotate at least one of the platform 111 or the canister 114 so that the canister 114 is accurately positioned to enable grinding operations to be performed on identified defective portions of the of the weld joint 115.

After the canister 114 is positioned such that a weld defect identified in the weld joint 115 is positioned in close proximity to the grinder apparatus 202, the grinder apparatus 202 is manipulated and controlled by the processing circuitry 108 such that the grinding wheel 208 is positioned to grind the weld defect. During the manipulation of the grinder apparatus 202, the grinding wheel 208 is initially caused to contact a surface of the canister 114. The switch 211 detects such contact and the processing circuitry 108 determines the location of the grinding wheel 208 relative to the surface of the canister 114. After the grinding wheel 208 makes contact with the weld joint 115, the switch 211 detects the contact and provides feedback to the processing circuitry 108. The processing circuitry 108 starts the grinding operation by rotating the grinding wheel 208. The rotation speed of the canister 114, the grinding process, and the number of passes made by the grinding wheel 208 over the weld joint 115 are controlled by the processing circuitry 108. They are based on the grinding profile generated by the processing circuitry 108 for the weld defect of the weld joint 115 based on information received from the processing circuitry 104. Further, the processing circuitry 108 generates a series of motion commands based on the generated grinding profile.

The progress of the grind is monitored (constantly, in some embodiments) by the processing circuitry 108 to ensure that the desired grinding profile is being achieved.

The grinding wheel 208 is operated so long as it makes contact with the weld joint 115 of the canister 114. For example, after completing a grinding operation of an identified weld defect in the weld joint 115, the grinding wheel 208 may no longer make surface contact with the weld joint 115. Such a condition is detected by the processing circuitry 108 which causes the grinding wheel 208 to cease operation (e.g., stop rotation).

In some embodiments, after the grinding operations are completed by the grinding assembly 106, the inspection assembly 102 is caused to further inspect the weld defect which has been subject to the grinding operations, in order to determine the presence of any further weld defects. If the grinding operations are accurately performed to grind out or remove the weld defect, then the inspection assembly 102 appropriately instructs the welding assembly 110 to perform welding operations to re-weld the weld joint. However, if grinding operations were not accurately performed, then the inspection assembly 102 instructs the grinding assembly 106 to perform further grinding operations to accurately grind the weld defect. In other embodiments, after the grinding operations are completed by the grinding assembly 106, re-welding of the defect may be performed by the welding assembly 110. The grinder apparatus 202 is connected to suction system via opening 118 (FIG. 1A) to collect waste materials produced during grinding operations and thereby minimizing introduction of such waste materials into the room 101.

Figure 3:
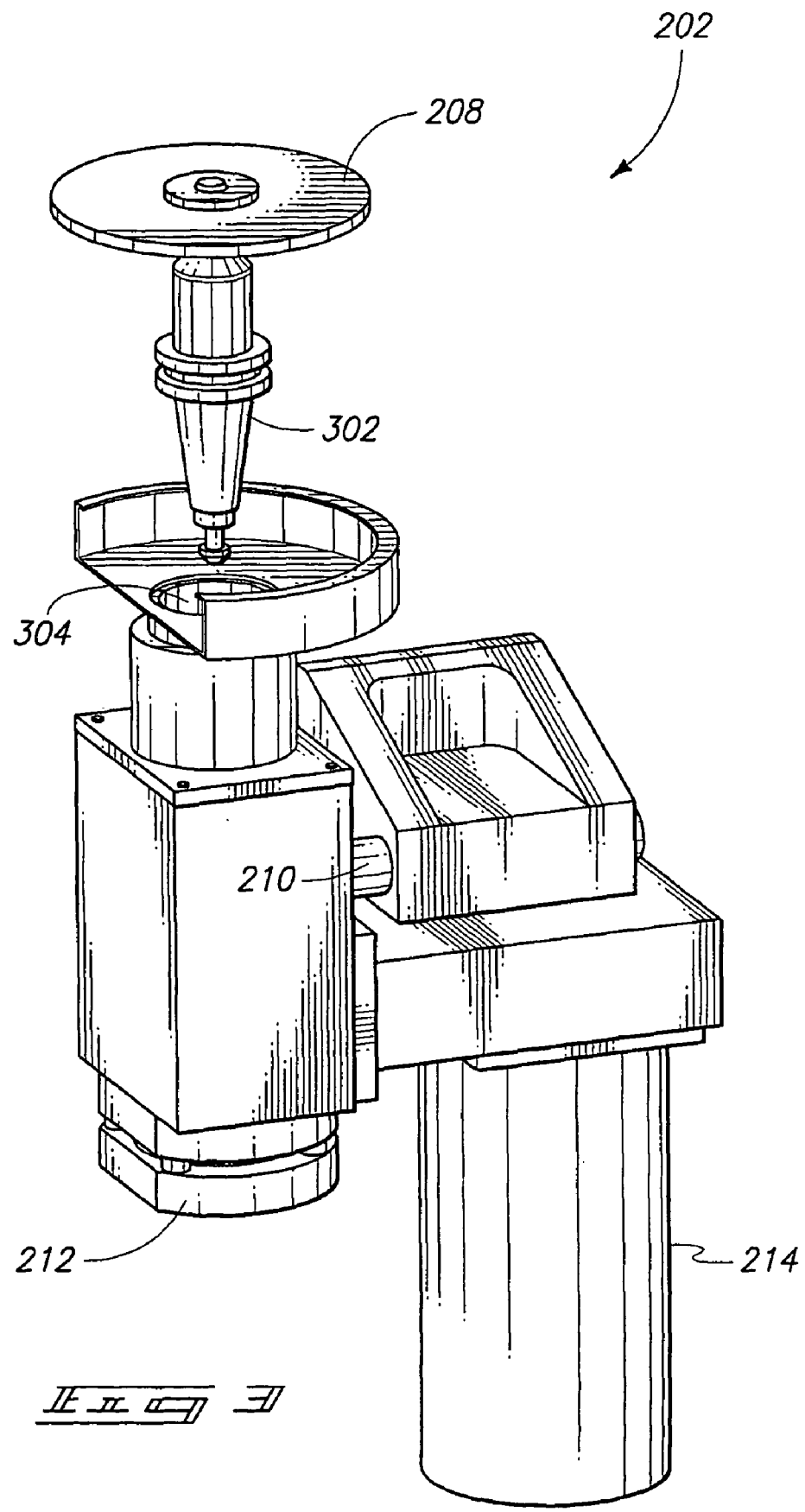
FIG. 3 is a perspective view of an automated grinding apparatus of the grinder assembly shown in FIG. 2.

FIG. 3 is a perspective view of the grinder apparatus 202 shown in FIG. 2. In addition to the details illustrated in FIG. 2, the grinder apparatus 202 includes a mounting fixture 302 (e.g., in the form of a tapered collet) for the grinding wheel 208. The mounting fixture 302 is configured to be removably attached to grinder apparatus 202. The air cylinder 212 can be operated remotely to replace the grinding wheel 208 without personnel intervention. As noted above, the mounting fixture 302 for the grinding wheel 208 is designed so that other tools (e.g., wire wheel brush) can be removably supported on the mounting fixture.

FIG. 4 is an exemplary functional block diagram of the processing circuitry 108 associated with the grinding assembly 106 in accordance with some embodiments of the invention. The processing circuitry 108 includes a communications interface 402, a processor 404, and a storage device 406 having a database 408. The processing circuitry 104 and 112 associated with inspection assembly 102 and the welding assembly 110 may be configured similar to the processing circuitry 108.

The communications interface 402 is configured to communicate electronic data externally of the processing circuitry 108, for example, with respect to the inspection and welding assemblies 102 and 110, respectively, and the processing circuitry (e.g., 104, 112) respectively associated with the inspection and welding assemblies 102, 110. In some embodiments, the communications interface 402 may be configured to communicate information related to weld defects identified by the inspection assembly 102. The communications interface 402 may comprise a parallel port, USB port, EIO slot, network interface card, and/or other appropriate configuration capable of communicating electronic data.

The processor 404 is configured to process data (e.g., receive weld defect information and compute grinding profiles based on the weld defect information) and control operations of the grinder apparatus 202 (e.g., movement in horizontal and vertical directions, rotational control of the grinding wheel 208) to grind a weld defect identified in the weld joint 115 (FIG. 1A). The grinding profiles are computed by the processor 404 based on the weld defect information received from the inspection assembly 102 and using logic (e.g., algorithms, code) stored in the storage device 406. In one embodiment, the processor may comprise circuitry configured to execute computer software code. For example, the processor may be implemented as a microprocessor or other structure configured to execute executable instructions of programming including, for example, software and/or firmware instructions. Other exemplary embodiments of the processor 404 include hardware logic, PGA, FPGA, ASIC, and/or other structures. These examples of the processor 404 are for illustration and other configurations are possible for implementing operations discussed herein.

The storage device 406 may be configured to store electronic data, file systems having one or more electronic files, programming such as executable instructions (e.g., software and/or firmware), and/or other digital information and may include processor-usable media. Processor-usable media includes any article of manufacture that can contain, store, or maintain programming, data and/or digital information for use by or in connection with an instruction execution system including processing circuitry in the exemplary embodiment. For example, exemplary processor-usable media may include any one of physical media such as electronic, magnetic, optical, electromagnetic, and infrared or semiconductor media. Some more specific examples of processor-usable media include, but are not limited to, a portable magnetic computer diskette, such as a floppy diskette, zip disk, hard drive, random access memory, read only memory, flash memory, cache memory, and/or other configurations capable of storing programming, data, or other digital information.

The storage device 406 includes a database 408 that may be stored with information for generating grinding profiles (e.g., contour grinding profiles) to grind the weld defects in weld joints (e.g., weld joint 115) identified by the inspection assembly 102.

The processing circuitry 104 and 112 associated with the inspection and welding assemblies 102, 110, respectively, are configured to control various operations of such assemblies.

Referring to FIG. 5, a methodology for implementing inspection, grinding, and welding operations to repair weld defects identified in weld joints (e.g., weld joint 115) of a workpiece (e.g., canister 114) in accordance with some embodiments of the invention.

At a step 502, inspection of weld joints (e.g., weld joint 115) is performed by the inspection assembly 102.

At a step 504, an inquiry is made to determine defects in the weld joint 115. If a weld defect is identified in the weld joint, step 506 is performed. If no weld defects are found, the method ends. As mentioned above, identification of the weld defect may be performed using one or more of ultrasound, eddy current, laser, and visual inspection techniques.

At a step 506, information (e.g., position, geometry) related to the weld defect of the weld joint is collected by the inspection assembly 102. The method then proceeds to step 508.

At a step 508, information related to the weld defect is provided to the grinding assembly 106. More specifically, the information is provided to the processing circuitry 108 of the grinding assembly 106. The method then proceeds to step 510.

At a step 510, the processing circuitry 108 creates a distinct contour grinding profile to grind the weld defect. The method then proceeds to step 512.

At a step 512, at least the workpiece (e.g., canister 114) or the platform supporting the grinding assembly is manipulated to accurately position the workpiece to receive grinding operations. The method then proceeds to step 513.

At a step 513, inspection of the repaired (e.g., grinded) weld joint cavity is performed. The method then proceeds to step 514.

At a step 514, an inquiry is made to determine if additional weld defects are present in the weld joint. The method proceeds to step 506 if additional weld defects are present. Otherwise, the method proceeds to step 516.

At a step 516, re-welding of the defective portions of the weld joint of the workpiece is performed.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A grinding assembly for grinding a weld joint of a workpiece, comprising:
   a grinder apparatus including:
      a grinding wheel configured to grind the weld joint;
      a member configured to receive the grinding wheel, the member being configured to be removably attached to the grinder apparatus; and
      a sensor assembly configured to detect a contact between the grinding wheel and the workpiece;
   a processing circuitry in communication with the grinder apparatus and configured to control operations of the grinder apparatus, the processing circuitry configured to receive weld defect information of the weld joint from an inspection assembly to create a contour grinding profile to grind the weld joint in a predetermined shape based on the received weld defect information, the processing circuitry configured to detect the contact to determine a position of the grinding wheel relative to the workpiece in order to manipulate at least the workpiece or a platform carrying the grinder apparatus into a position to grind the weld defect of the workpiece, the processing circuitry further configured to operate the grinding wheel to grind the weld joint based on the contour grinding profile; and
   a manipulator having an end configured to carry the grinder apparatus, the manipulator further configured to operate in multiple dimensions.

2. The grinding assembly of claim 1, wherein the manipulator is configured to reciprocate along a horizontal and vertical axis.

3. The grinding assembly of claim 1, further comprising an air cylinder, and the member is configured to detachably receive individual ones of a plurality of devices by operating the air cylinder, wherein individual one of the devices is configured to perform distinct operations on the workpiece.

4. The grinding assembly of claim 1, wherein the member comprises a tapered collet.

5. The grinding assembly of claim 1, wherein the sensor assembly comprises a switch mechanism configured to stop grinding operation when no contact is detected between the grinding wheel and the workpiece.

6. The grinding assembly of claim 1, wherein the sensor assembly comprises a trigger switch that is in communication with the processing circuitry, the trigger switch being configured to selectively enable or disable grinding operation based on positioning of the grinding wheel relative to the workpiece.

7. The grinding assembly of claim 6, wherein the trigger switch is configured to enable the grinding operation when a contact is detected between the grinding wheel and a surface of the workpiece.

8. The grinding assembly of claim 1, further comprising a rotatable platform, the grinding assembly being mounted on the rotatable platform.

9. The grinding assembly of claim 8, wherein the processing circuitry is configured to detect a contact position of the grinding wheel with the workpiece, the detected position and the weld defect information of the weld joint as determined by the inspection assembly are provided to a control computer disposed external of the grinding assembly.

10. The grinding assembly of claim 9, wherein the control computer is configured to manipulate at least one of the workpiece and the rotatable platform such that the grinding apparatus is positioned to grind the weld joint.

11. The grinding assembly of claim 10, further comprising a reciprocating base member configured to hold the workpiece, wherein the rotatable platform includes an opening through which the workpiece is inserted into a housing using the reciprocating base member, and wherein in an extended state of the reciprocating base member, the workpiece is introduced into the housing for processing by the inspection assembly and the grinding assembly.

12. The grinding assembly of claim 1, wherein the grinder apparatus is retractably mounted on the manipulator.

13. The grinding assembly of claim 1, wherein the grinder apparatus is configured to be remotely operated.

14. The grinding assembly of claim 1, wherein the inspection assembly further comprises ultrasonic, eddy current, laser, and visual inspection tools, wherein the weld defects of the workpiece are determined by the inspection assembly using at least one of the ultrasonic, eddy current, laser, or visual inspection tools.

15. The grinding assembly of claim 1, wherein the contour grinding profile includes information for adjusting rotation speed of the workpiece, horizontal and vertical movement of the grinding apparatus, and a number of passes of the grinding wheel over defective portions of the weld joint to grind the weld defects.

16. The grinding assembly of claim 1, wherein the inspection assembly is located external of the grinder apparatus.

17. The grinding assembly of claim 1, wherein the processing circuitry is configured to store information related to a variety of weld joint defects, and logic to create distinct grinding profiles to rectify the weld joint defects based on the stored information.

18. The grinding assembly of claim 17, wherein the contour grinding profile determines an amount of material that the grinder apparatus should remove from the weld joint to rectify the weld defects.

19. The grinding assembly of claim 1, wherein the processing circuitry is further configured to control operations of the manipulator and the grinder apparatus.

20. A grinder apparatus for grinding a weld joint of a workpiece, comprising:
- an inspection assembly configured to inspect a weld joint of the workpiece to identify weld joint defects:
- a grinding wheel configured to grind the weld joint and configured to be driven by a motor;
- circuitry configured to receive weld defect information of the weld joint from the inspection assembly to create a grinding profile and to cause the grinding wheel to grind the weld joint based on the weld defect information from the inspection assembly; and
- a sensor assembly in communication with the motor, the sensor assembly configured to detect a contact between the grinding wheel and the workpiece to operate the grinding wheel to grind the weld joint.

21. The grinding apparatus of claim 20, wherein the grinding wheel is provided on a manipulator configured to reciprocate along a horizontal and vertical direction.

22. The grinding apparatus of claim 20, further comprising an air cylinder, and a removably attachable member configured to detachably receive individual ones of a plurality of tools including the grinding wheel, the removably attachable member being activated by operating the air cylinder.

23. The grinding apparatus of claim 22, wherein the removably attachable member comprises a tapered collet.

24. The grinding apparatus of claim 20, wherein the sensor assembly comprises a mechanism configured to stop operation of the grinding wheel when no contact is detected between the grinding wheel and the workpiece.

25. The grinding apparatus of claim 24, wherein the sensor assembly comprises a trigger switch in communication with the processing circuitry, the trigger switch being configured to selectively enable and disable grinding operation based on a position of the grinding wheel relative to the workpiece.

26. The grinding apparatus of claim 25, wherein the grinding is performed when a contact is detected between the grinding wheel and a surface of the workpiece.

27. The grinding apparatus of claim 20, wherein the grinding apparatus is mounted at least on one of a fixed platform and a rotatable platform.

28. The grinding apparatus of claim 27, further comprising a control computer disposed external of the grinding apparatus, and wherein the circuitry configured to receive weld defect information is further configured to detect a contact position of the grinding wheel with the workpiece, the detected position and information related to the weld defect of the weld joint being provided to the control computer, the control computer being configured to manipulate at least one of the workpiece and the rotatable platform such that the grinding wheel is positioned to grind the weld defect.

29. The grinding apparatus of claim 28, and further comprising a housing, wherein the grinding apparatus is located in the housing, the housing being made of radiation shielding material.

30. The grinding apparatus of claim 20, wherein the distinct grinding profile includes information for adjusting rotation speed of the workpiece, horizontal and vertical movement of the grinding apparatus, and a number of passes of the grinding wheel over the weld joint to rectify the weld defect.

31. The grinding apparatus of claim 30, wherein the distinct grinding profile determines an amount of material that the grinding wheel should remove from the weld joint.

32. A weld joint defect repair system, comprising:
- an inspection assembly having a first processor in communication therewith, the inspection assembly configured to inspect weld joints of a workpiece to identify weld joint defects;
- a grinding assembly having a grinding apparatus and second processor in communication therewith, the second processor configured to receive information related to the weld joint defects from the first processor, the second processor further configured to create a distinct contour grinding profile based on the received information, the grinding apparatus including:
  - a grinding wheel configured to grind the weld joints to rectify the weld joint defects;
  - a removably attachable member configured to detachably receive individual ones of a plurality of tools including the grinding wheel; and
  - a sensor assembly configured to detect a contact between the grinding wheel and the workpiece to operate the grinding wheel to grind the weld joints based on the contour grinding profile created by the second processor; and
- a welding assembly having a third processor in communication with the welding assembly and the first and second processors, the third processor configured to receive information related to the weld joint defects from the first processor and a contact location of the grinding wheel with the workpiece from the second processor, the third processor further configured to manipulate at least one of the workpiece or a platform carrying the inspection assembly, the grinding assembly, and the welding assembly in order to accurately position the grinding wheel and the workpiece to grind the weld joints to rectify the weld joint defects.

33. The system of claim 32, wherein the inspection assembly comprises at least one of an ultrasonic inspection apparatus, an eddy current inspection apparatus, a laser inspection apparatus, and a camera configured to perform visual inspection.

34. The system of claim 32, wherein the first, second, and third processors individually comprise a memory, a storage device, and a communications interface configured to communicate with external devices.

35. The system of claim 32, further comprising a radiation proof housing, wherein the inspection assembly, grinding assembly, and the welding assembly are disposed in the radiation proof housing.

36. The system of claim 35, further comprising a radiation proof shield, wherein the first, second, and third processors are disposed in the radiation proof housing and configured to be protected by the radiation proof shield from harmful radiation of material contained in the workpiece.

37. The system of claim 36, further comprising an exhaust vent attached to an external suction system in order to remove debris from the housing.

38. A method of correcting weld joint defects of an object, comprising:
- machine inspecting a weld joint of the object to determine a defect;
- collecting information corresponding to the defect;
- providing the collected information to a grinding assembly having a grinder apparatus and a processing circuitry that is in communication with the grinder apparatus, the grinder apparatus having a grinding wheel, a sensor switch, and a manipulator arm configured to carry the grinding wheel;

generating a contour grinding profile based on the collected information to grind the weld joint to rectify the defect;

rotating one of the object and a platform carrying the grinding assembly to position the grinding wheel to grind the weld joint; and operating the grinding wheel based on the contour grinding profile to remove the defect of the weld joint.

39. The method of claim 38, wherein the inspecting comprises inspecting the weld joint by at least one of ultrasonic, eddy current, and laser inspection.

40. The method of claim 38, wherein the collecting comprises collecting the information by a processor, and the providing comprises providing the collected information by the processor to the processing circuitry of the grinding assembly.

41. The method of claim 38, wherein the operating is performed if the grinding wheel is detected to be in physical contact with the object.

* * * * *